United States Patent
Choi et al.

(10) Patent No.: US 7,051,325 B2
(45) Date of Patent: May 23, 2006

(54) APPARATUS AND METHOD FOR UPGRADING SOFTWARE

(75) Inventors: Jong Sung Choi, Seoul (KR); Dong Hyeon Joh, Seoul (KR)

(73) Assignee: LG Electronics Inc., Seoul (KR)

( * ) Notice: Subject to any disclaimer, the term of this patent is extended or adjusted under 35 U.S.C. 154(b) by 538 days.

(21) Appl. No.: 10/084,446

(22) Filed: Feb. 28, 2002

(65) Prior Publication Data
US 2002/0120885 A1 Aug. 29, 2002

(30) Foreign Application Priority Data
Feb. 28, 2001 (KR) ................ 2001-10500

(51) Int. Cl.
*G06F 9/44* (2006.01)
*H04N 7/173* (2006.01)
*H04N 7/16* (2006.01)

(52) U.S. Cl. .............. 717/168; 725/132; 725/140; 725/152

(58) Field of Classification Search ........ 717/168–178; 713/750; 725/132, 140, 152
See application file for complete search history.

(56) References Cited

U.S. PATENT DOCUMENTS

| | | | | |
|---|---|---|---|---|
| 4,739,398 A | * | 4/1988 | Thomas et al. | 725/22 |
| 4,788,637 A | * | 11/1988 | Tamaru | 709/221 |
| 5,666,293 A | * | 9/1997 | Metz et al. | 709/220 |
| 6,018,645 A | * | 1/2000 | Spatz et al. | 455/88 |
| 6,031,830 A | * | 2/2000 | Cowan | 370/338 |
| 6,331,876 B1 | * | 12/2001 | Koster et al. | 348/725 |
| 6,343,379 B1 | * | 1/2002 | Ozawa et al. | 725/63 |
| 6,425,125 B1 | * | 7/2002 | Fries et al. | 717/168 |
| 6,470,496 B1 | * | 10/2002 | Kato et al. | 717/173 |
| 6,473,858 B1 | * | 10/2002 | Shimomura et al. | 713/150 |
| 6,532,591 B1 | * | 3/2003 | Arai et al. | 725/132 |
| 6,754,894 B1 | * | 6/2004 | Costello et al. | 717/169 |
| 6,820,259 B1 | * | 11/2004 | Kawamata et al. | 717/173 |

FOREIGN PATENT DOCUMENTS

JP  2000-115650 A  4/2000

* cited by examiner

*Primary Examiner*—Wei Y. Zhen
*Assistant Examiner*—Trenton Roche
(74) *Attorney, Agent, or Firm*—Birch, Stewart, Kolasch & Birch, LLP

(57) ABSTRACT

An apparatus and method for upgrading a software, including a version comparing unit for comparing a version of a software code and a version of a previously installed software code to determine a newer version and an upgrade processing unit for installing the software by abstracting software data in the software code, can automatically install an upgraded system software in a corresponding apparatus for receiving digital broadcasting by detecting the code of the system software simultaneously included in an advertisement broadcasting and an advertisement broadcasting signal.

25 Claims, 5 Drawing Sheets

US 7,051,325 B2

APPARATUS AND METHOD FOR UPGRADING SOFTWARE

BACKGROUND OF THE INVENTION

1. Field of the Invention

The present invention relates to technique for upgrading a software and particularly, to an apparatus and method for upgrading a software capable of upgrading a system software installed in an apparatus for receiving digital broadcasting.

2. Description of the Background Art

Since the conventional apparatus for receiving digital broadcasting is under the condition that the spec of broadcasting transmission/reception is not completely determined, new functions are needed to be added further or the software is needed to be upgraded continuously to solve the problems of the conventional mass production system. However, mostly, a user must directly visit an A/S center to upgrade a system software of an apparatus for receiving digital broadcasting.

On the other hand, there is a system composed to download a software by linking some satellite broadcasting stations and Internet but still the method for upgrading software by broadcasting signal is not in use at all. Here, if the codes of the software are transmitted at the time that the broadcasting program is on the air or at a predetermined time, request for additional transmission from the broadcasting company must be made and receiver enterprises must pay the cost.

Also, there were many problems that the user must wait a predetermined time and operate the apparatus for receiving digital broadcasting to upgrade the software and the like.

SUMMARY OF THE INVENTION

Therefore, the present invention provides an apparatus and method for upgrading a software capable of installing a system software automatically upgraded in a corresponding apparatus for receiving digital broadcasting by detecting the code of the system software included in an advertisement broadcasting and an advertisement broadcasting signal at the same time.

Another object of the present invention is to provide an apparatus and method for upgrading a software capable of reducing time and costs for upgrading software by automatically installing an upgraded system software in an apparatus for receiving corresponding digital broadcasting simultaneously when advertisement broadcasting is on the air.

Still another object of the present invention is to provide an apparatus and method for upgrading a software capable of improving convenience for the user by automatically upgrading the software for the user just by watching the advertisements.

To achieve these and other advantages and in accordance with the purpose of the present invention, as embodied and broadly described herein, there is provided an apparatus for upgrading a software, including a version comparing unit for comparing a version of a software code and a version of a previously installed software code to determine a newer version and an upgrade processing unit for installing the software by abstracting software data in the software code.

To achieve these and other advantages and in accordance with the purpose of the present invention, as embodied and broadly described herein, there is provided a method for upgrading a software, including the steps of receiving a broadcasting in which a user data containing a software code is inserted and installing the software by storing software data from the software code.

The foregoing and other, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the apparatus for upgrading software capable of abstracting data of an upgraded system software and code of the system software, included in the advertisement broadcast and advertisement broadcasting signal and automatically installing an upgraded system software in the corresponding apparatus for receiving digital broadcasting, will be illustrated with reference to FIGS. 1 to 5.

First, advertisement broadcasting is telecast in the middle or after ending of a regular broadcasting program and it includes a video data region, audio data region and user data region. Here, necessary information in accordance with the present invention can be inserted into the user data region. Namely, the data and code of upgraded system software are inserted in the user data region and transmitted into the apparatus for receiving digital broadcasting. Here, the data of the upgraded system software is inserted in the code of the system software. The data structure contained in the user data region is described in detail with reference to FIG. 1.

Figure 1:
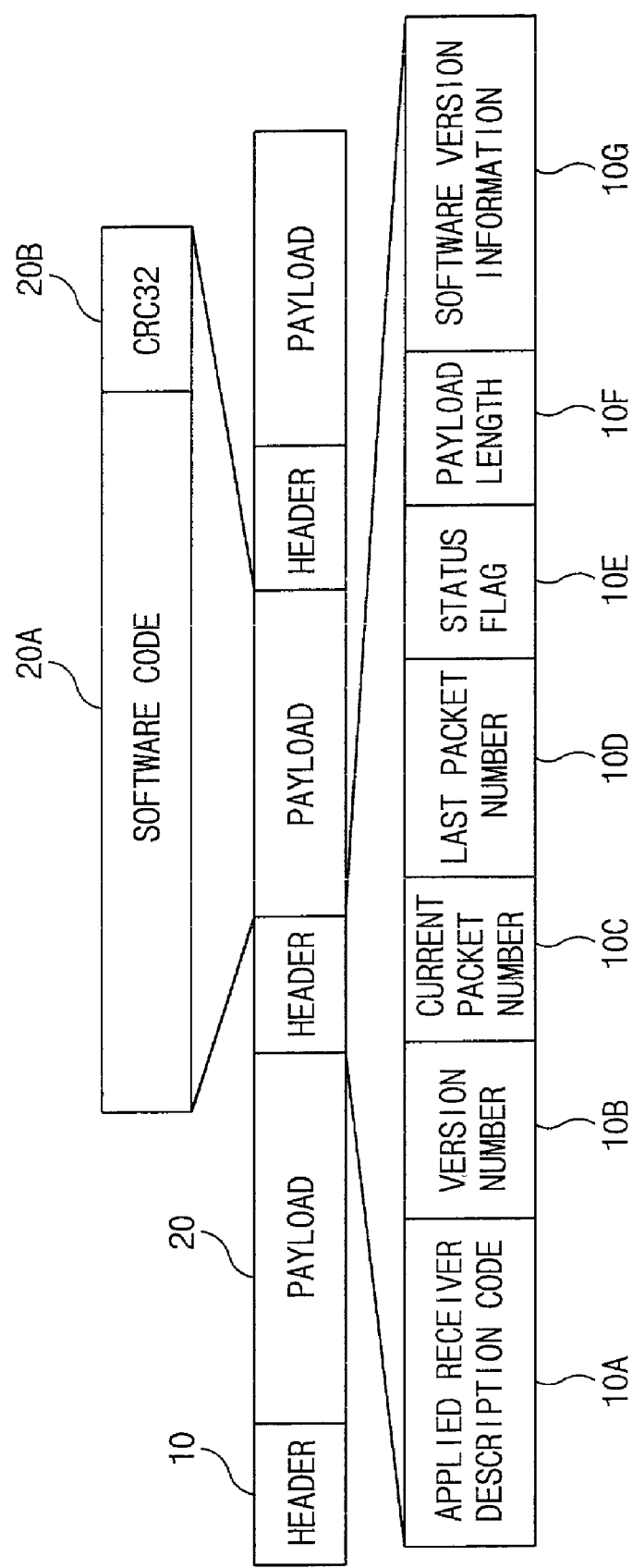
FIG. 1 is a view showing a data structure included in a user data region in an advertisement broadcasting signal in accordance with the present invention.

FIG. 1 is a view showing a data structure included in a user data region in an advertisement broadcasting signal in accordance with the present invention.

As shown in FIG. 1, the user data structure includes a header block 10 containing basic index information about system software and payload block 20 containing the software code in the packet type.

Also, the header block 10 and the length of the payload block can be adjusted according to respective systems.

The header block 10 includes an applied receiver description code block 10A for checking a receiving apparatus which performs software upgrade by recording brand name and model number of the receiving apparatus, a version number block 10B for showing version information of the software code, a current packet number block 10C for showing order of the current packets when receiving the software code divided into a number of packets, a last packet number block 10D for checking the total number of the packets, a status flag block 10E for recording an error correction type and information of beginning and ending address of a target memory, a payload length block 10F for recording the length of a payload and a software version information block 10G for recording guide information about the code version of the software. Here, the receiver checking code 10A is information which must be checked before the apparatus for receiving digital broadcasting downloads a software and the payload length block 10F can generally include length of 32 bit code for CRC checking.

On the other hand, the payload block 20 includes a software code unit 20A for recording the code of the software which is divided into packet units with a certain size and error check block (CRC32) 20B for checking whether an error exists in the received packet and correcting the error.

Hereinafter, the apparatus for receiving digital broadcasting will be described with reference to FIG. 2.

Figure 2:
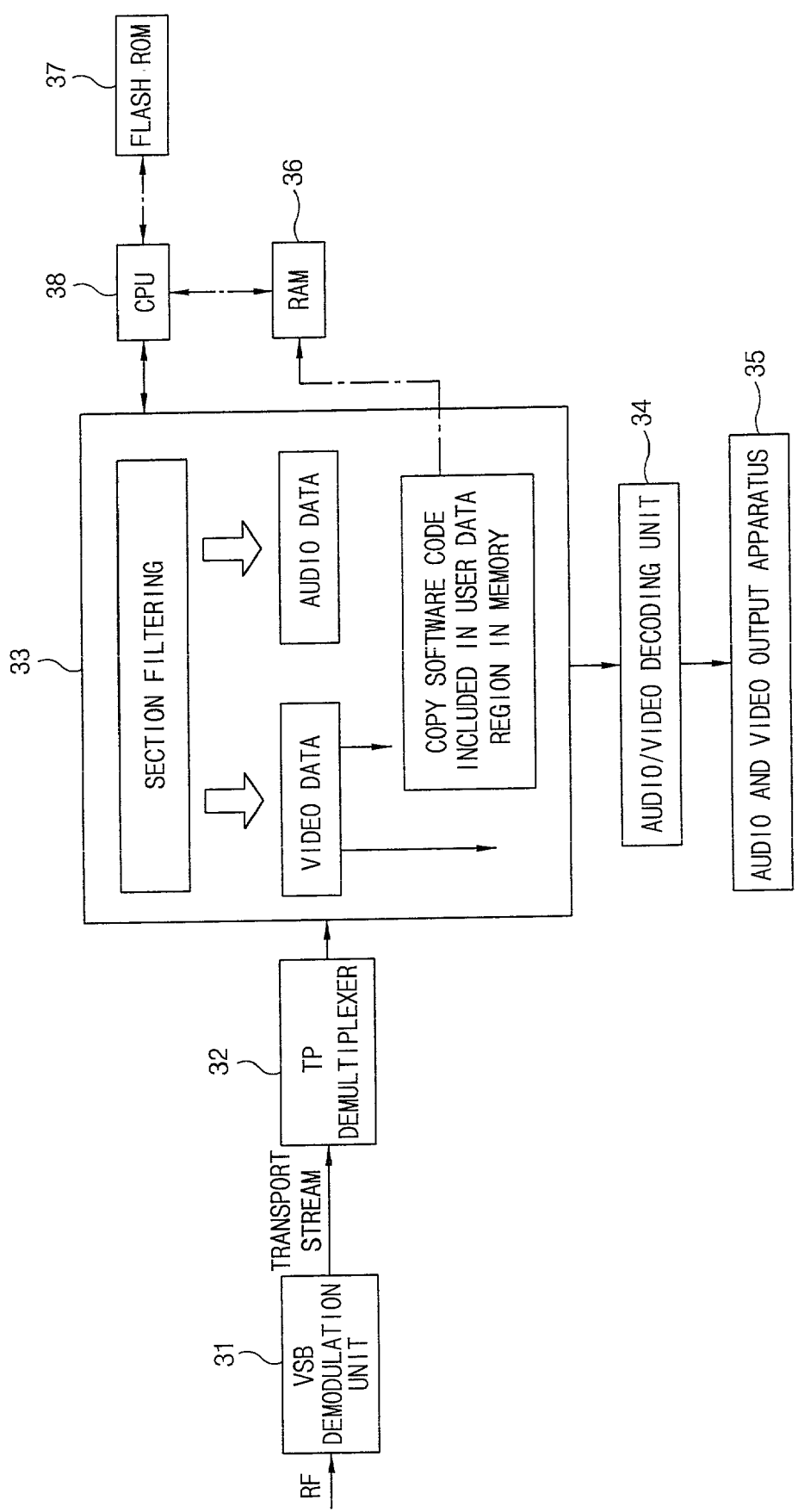
FIG. 2 is a block diagram showing a structure of an apparatus for receiving digital broadcasting to describe the present invention.

FIG. 2 is a block diagram showing a structure of an apparatus for receiving digital broadcasting to describe the present invention.

As shown in FIG. 2, the apparatus for receiving digital broadcasting includes a vestigial-sideband (VSB) demodulation unit 31 for converting digital broadcasting signals RF into the transport stream type, a transport (TP) de-multiplexer 32 for abstracting just a stream in the transport stream, an audio/video signal separating unit 33 for separating and outputting audio/video signal abstracted in the TP de-multiplexer 32, an audio/video decoding unit 34 for decoding the audio/video signal separately outputted from the audio/video signal separating unit 33, Random Access Memory (RAM) 36 for temporarily storing the code of the system software contained in the user data region of the stream abstracted by the TP de-multiplexer 32, Read Only Memory (ROM) 37 for storing the code of the system software and Central Processing Unit 38 for controlling the respective units so that the system can be smoothly operated.

Namely, the apparatus for receiving digital broadcasting in accordance with the present invention further includes an apparatus for upgrading system software which is previously installed by downloading the code of the system software included in the advertisement broadcasting signal. The composition will be described in detail with reference to FIG. 3.

Figure 3:
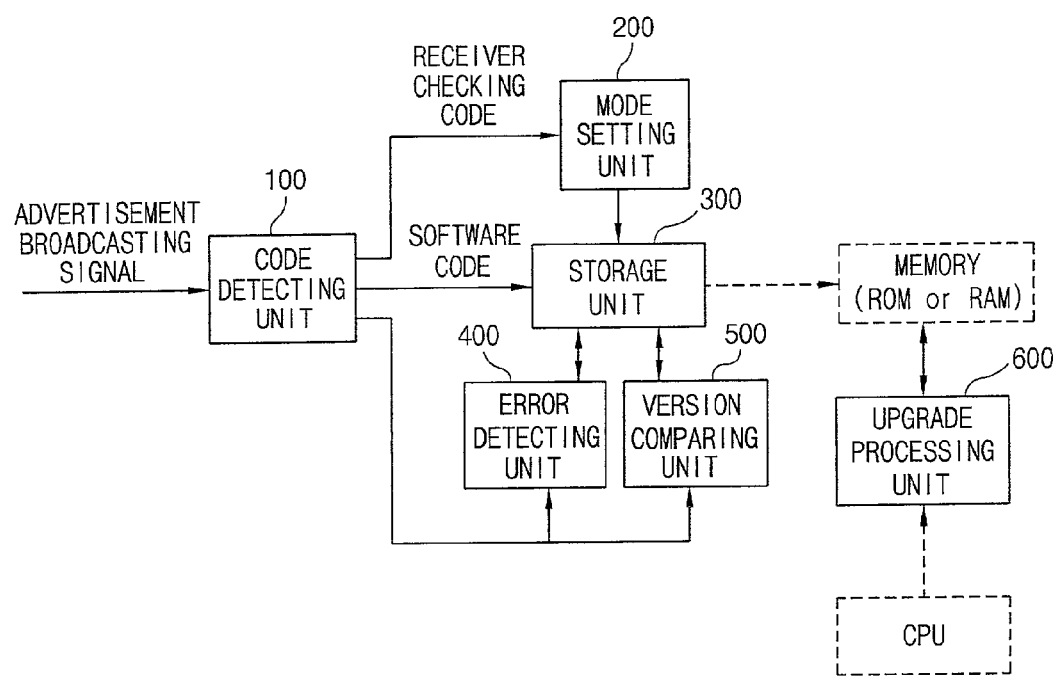
FIG. 3 is a block diagram showing a structure of an apparatus for upgrading system software of the apparatus for receiving digital broadcasting in accordance with the present invention.

FIG. 3 is a block diagram showing a structure of an apparatus for upgrading system software of the apparatus for receiving digital broadcasting in accordance with the present invention.

As shown in FIG. 3, the apparatus for upgrading system software includes a code detecting unit 100 for detecting whether the software code is inserted in the broadcasting signal, a mode setting unit 200 for setting a download-possible mode by determining whether the system software code can be downloaded when an advertisement broadcasting signal in which the software code is inserted is received, a storage unit 300 for automatically downloading the code of the system software and storing the code, an error detecting unit 400 for determining whether an error exists in the stored software code, a version comparing unit 500 for comparing a version of the downloaded software code and the version of a software code previously installed in the RAM and flash ROM 36 and 37 to determine a newer version and an upgrade processing unit 600 for installing the upgraded software by abstracting the data of the upgraded software in the code of the system software by checking whether the user will perform upgrade (or patch).

Hereinafter the operation of the apparatus for upgrading the system software of the apparatus for receiving digital broadcasting in accordance with the present invention will be described in detail with reference to FIG. 4.

Figure 4:
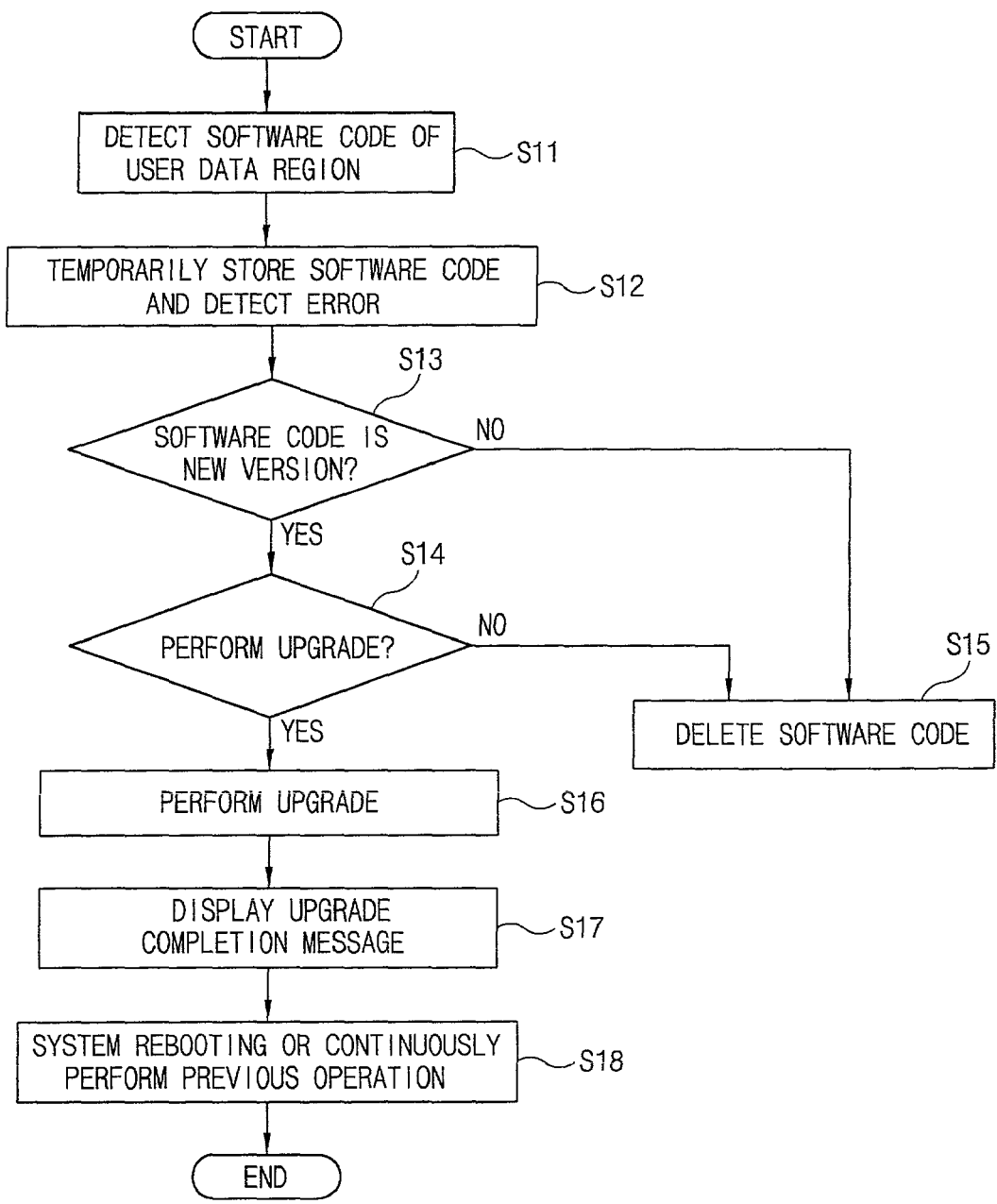
FIG. 4 is a flow chart showing a method for upgrading a software, in accordance with the present invention.

FIG. 4 is a flow chart showing the method for upgrading a software, in accordance with the present invention.

First, the code detecting unit 100 detects the code of the system software inserted in the user data region in the advertisement broadcasting signal, when the advertisement broadcasting signal (S 11). Namely, the code detecting unit 100 detects the code of the system software inserted in the user data region in the advertisement broadcasting signal, when an advertisement of a certain company is broadcast on the screen of the apparatus for receiving digital broadcasting. Here, the code of the system software inserted in the user data region in the advertisement broadcasting signal is a code of an upgraded system software. Also, the above certain company can be a company which produces the apparatus for receiving digital broadcasting.

Then, the mode setting unit 200 sets the down-possible mode if the code of the system software inserted in the user data region can be downloaded. Namely, it checks whether the system software code is appropriate for the corresponding model of the receiving apparatus with the applied receiver description code block 10A contained in the header block of the user data region in the advertisement broadcasting signal. At this time, the storage unit 300 stores user data inserted in the advertisement broadcasting signal in case the mode setting unit 200 sets the download-possible mode (S12). Namely, the storage unit 300 automatically downloads the code of the system software inserted in the user data and stores the code.

The error detecting unit 400 determines whether an error exists in the stored software code in case the code of the downloaded system software is appropriate for the model of the corresponding apparatus for receiving digital broadcasting (S12). At this time, the version comparing unit 500 checks the software version information 10G included in the header block 10 of the user data region in the advertisement broadcasting signal and determines whether the version of the downloaded software code is a newer version than the version of the code of the previously installed system software (S13).

Then, the upgrade processing unit 600 downloads the stored code of the system software if the stored code does not contain errors and the code has newer version than the previously installed system software.

Also, the upgrade processing unit 600 notices the user that a code of a system software with a new version is downloaded (received) through an information displaying means, such as an On Screen Display (OSD) and checks whether upgrade (or patch) will be performed (S14). For instance, the upgrade processing unit 600 questions the user through the information displaying means, such as the On Screen Display (OSD) that, "Will you install a new software?" and if the user answers that "Yes", the upgrade processing unit 600 instantly performs upgrading (or patch) (S16). Namely, the upgrade processing unit 600 stores the code of downloaded system software in the RAM and ROM 36 and 37 and installs the upgraded system software by abstracting the data of the system software in the code of the system software. Therefore, the downloaded system software is upgraded at the same as the advertisement broadcasting and accordingly can be installed in the apparatus for receiving digital broadcasting.

On the other hand, the upgrade processing unit 600 questions the user through the information displaying means, such as the On Screen Display (OSD) that, "Will you install a new software?" and at this time, if the user answers that "No", the upgrade processing unit 600 deletes the code of the downloaded system software and gives up upgrading (S15). Also, the upgrade processing unit 600 deletes the code of the downloaded system software if the received software code has the same version as the current version or the previous version.

Then, the upgrade processing unit 600 notices an upgrade completion message on the OSD, when the upgrade (or patch) process of the software (S17). At this time, the apparatus for receiving digital broadcasting notices the user about the added functions or a bug revising note or performs the previous operation continuously after apparatus reboots itself at need (S18).

Here, the software upgrade means that the whole system software of the receiver is reinstalled. Also, the patch means as a simple addition of a function and the conventional system program of the receiver has a method of just adding several functions under the same condition. Generally, the receiver may not be necessarily rebooted.

Figure 5:
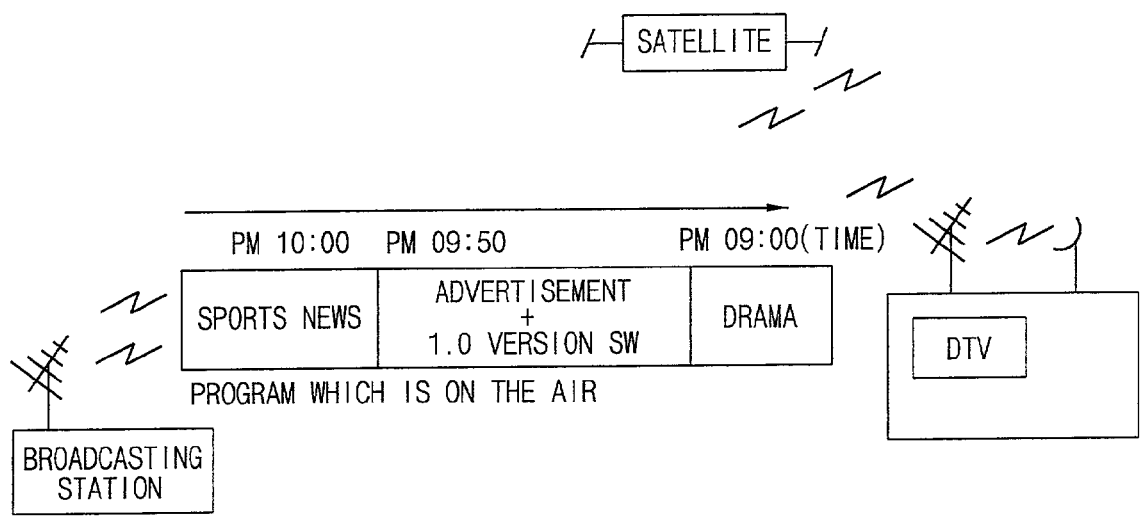
FIG. 5 is a view logically illustrating a method for transmitting an advertisement broadcasting signal in accordance with the present invention.

FIG. 5 is a view logically illustrating a method for transmitting an advertisement broadcasting signal in accordance with the present invention.

As shown in FIG. 5, when an advertisement is broadcast at an interval between the news broadcasting time and drama broadcasting time, that is, when the advertisement broadcasting signal is transmitted to the receiving apparatus, if a new software is added to the advertisement broadcasting signal and the signal is transmitted to the receiving apparatus, the user can notice that a new software is installed simultaneously watching the advertisement. Namely, the user does not need to visit an A/S center to install the new software in the receiving apparatus.

Also, the present invention can easily install an upgraded software in the corresponding apparatus for receiving digital broadcasting just by inserting the software in the advertisement broadcasting signal in a system using a Moving Picture Expert Group (MPEG) as the abstracting means such as digital cable broadcasting or digital satellite broadcasting as well as Digital Television DTV in the Advanced Television Systems Committee (ATSC) method.

As described above, the apparatus for upgrading a software in accordance with the present invention can automatically install the upgraded system software in the corresponding apparatus for receiving digital broadcasting by receiving the code of the system software simultaneously included in the advertisement broadcasting signal and advertisement broadcasting.

Also, the apparatus for upgrading a software in accordance with the present invention can automatically install the system software upgraded in the corresponding apparatus for receiving digital broadcasting simultaneously with the advertisement broadcasting and accordingly, the user can reduce time and cost generated to upgrade the system software of the receiver.

Also, the apparatus for upgrading a software in accordance with the present invention can improve convenience for the user by automatically upgrading the software for the user just by watching the advertisements.

Also, the apparatus for upgrading a software in accordance with the present invention can increase advertisement effect by leading the user to watch the advertisement until download of the software code included in the advertisement broadcasting signal is completed. Namely, since the user selects whether the system software will be upgraded notices that the system software is upgraded, the user watch an advertisement of a certain company without changing the broadcasting channel.

Also, the apparatus for upgrading a software in accordance with the present invention can be applied in the system using the Moving Picture Expert Group (MPEG) as the abstracting means, such as digital cable broadcasting or digital satellite broadcasting as well as the Advanced Television Systems Committee (ATSC) method which is a standard of the Digital Television DTV.

Also, the apparatus for upgrading a software in accordance with the present invention can easily upgrade a new software just by watching the advertisement broadcast at any time without directly visiting the A/S center, to upgrade a new software.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for upgrading a software of a television broadcasting signal receiving apparatus, comprising:
    a code detecting unit for detecting a software code included in an advertisement broadcasting signal during only broadcasting of an advertisement;
    a version comparing unit for comparing a version of the software code included in the advertisement broadcasting signal and a version of a previous software code installed on the television broadcasting signal receiving apparatus; and
    an upgrade processing unit for installing software associated with the software code included in the advertisement broadcasting signal on the television broadcasting signal receiving apparatus if the version of the software code is newer than the version of the previous software code.

2. The apparatus of claim 1, wherein the software code includes data of an upgraded system software.

3. The apparatus of claim 1, wherein the software is a system software to be installed in a digital television broadcasting signal receiving apparatus.

4. The apparatus of claim 1, wherein the software is an upgraded software.

5. The apparatus of claim 1, further comprising:
    a mode setting unit for setting a download-possible mode by determining whether the software code can be downloaded when the advertisement broadcasting signal in which the software code is inserted is received.

6. The apparatus of claim 1, further comprising:
    a storage unit for storing the software code.

7. The apparatus of claim 1, further comprising:
    an error detecting unit for determining whether an error exists in the software code included in the advertisement broadcasting signal.

8. The apparatus of claim 1, the advertisement broadcasting signal corresponds to an advertisement of a certain company.

9. A method for upgrading a software of a television broadcasting signal receiving apparatus, comprising the steps of:
   detecting a software code included in an advertisement broadcasting signal during only broadcasting of an advertisement;
   comparing a version of the software code included in the advertisement broadcasting signal and a version of a previous software code installed on the television broadcasting signal receiving apparatus; and
   installing software associated with the software code on the television broadcasting signal receiving apparatus.

10. The method of claim 9, wherein the software is a system software to be installed in a digital television broadcasting signal receiving apparatus.

11. The method of claim 9, further comprising a step of:
   checking whether the software code corresponds to a model of the television broadcasting signal receiving apparatus or an error exists when the advertisement broadcasting signal in which the software code is inserted is received.

12. The method of claim 9, further comprising a step of:
   deleting the software code when the version of the software code is not newer than the version of the previous software code; and
   checking whether the software will be upgraded when the version of the software code is newer than the version of the previous software code.

13. The method of claim 9, wherein the software is installed or deleted according to a response of a user.

14. The method of claim 9, wherein the user data includes:
   a header block including basic index information on the software; and
   a payload block including the software code.

15. The method of claim 14, wherein the header block and payload block are formed in a packet form.

16. The method of claim 14, wherein the header block comprises:
   an applied receiver description code block for checking the television broadcasting signal receiving apparatus which performs software upgrade by recording brand name and model number of the television broadcasting signal receiving apparatus;
   a version number block for showing version information of the software code;
   a current packet number block for showing an order of the current packets when receiving the software code divided into a number of packets;
   a last packet number block for checking the total number of the packets;
   a status flag block for recording an error correction type and information of beginning and ending address of a target memory;
   a payload length block for recording the length of a payload; and
   a software version information block for recording guide information about the code version of the software.

17. The method of claim 14, wherein the payload block comprises:
   a software code unit for recording the software code which is divided into packet units with a certain size; and
   an error check block for checking whether an error exists in the packet units and correcting the error.

18. An apparatus for upgrading a software of a digital television broadcasting signal receiving apparatus, comprising:
   a code detecting unit for receiving a digital advertisement broadcasting signal during only broadcasting of an advertisement and detecting whether the software code is inserted in a user data of the digital advertisement broadcasting signal;
   a mode setting unit for setting a download-possible mode by determining whether the software code is downloadable;
   a storage unit for downloading and storing the software code in case of the download-software possible mode;
   an error detecting unit for determining whether an error exists in the downloaded software code;
   a version comparing unit for comparing a version of the downloaded software code and a version of a previous software code installed on the digital television broadcasting signal receiving apparatus; and
   an upgrade processing unit for installing software associated with the software code on the digital television broadcasting signal receiving apparatus if the version of the downloaded software code is newer than the version of the previous software code and if no error exits in the downloaded software code.

19. The apparatus of claim 18, wherein the software code includes data of an upgraded system software.

20. A method for upgrading a software of a digital television broadcasting signal receiving apparatus, comprising the steps of:
   detecting a software code included in a digital advertisement broadcasting signal during only broadcasting of an advertisement;
   checking whether a software code inserted in the digital advertisement broadcasting signal corresponds to a model of the digital television broadcasting signal receiving apparatus or an error exists in the software code when the digital advertisement broadcasting signal is received;
   comparing a version of the software code and a version of a previous software code installed on the digital television broadcasting signal receiving apparatus;
   deleting the software code if the version of the software code is not newer than the version of the previous software code; and
   installing software associated with the software code on the digital television broadcasting signal receiving apparatus if the version of the software code is newer than the version of the previous software code.

21. The method of claim 20, wherein the software code includes data of an upgraded system software.

22. The apparatus of claim 1, wherein the upgrade processing unit automatically downloads the software code during broadcasting of the advertisement broadcasting signal regardless the version of the software code.

23. The method of claim 9, further comprising:
   automatically downloading the software code during broadcasting of the advertisement broadcasting signal regardless the version of the software code.

24. The apparatus of claim 18, wherein the upgrade processing unit automatically downloads the software code during broadcasting of the digital advertisement broadcasting signal regardless the version of the downloaded software code.

25. The method of claim 20, further comprising:
   automatically downloading the software code during broadcasting of the digital advertisement broadcasting signal regardless the version of the software code.

* * * * *